Dec. 23, 1952  J. HANDLEY  2,622,802
TOTALIZATOR SYSTEM
Filed Jan. 21, 1949  13 Sheets-Sheet 1

Inventor
John Handley
By Pennie, Edmonds, Morton, Barrows & Taylor
Attorneys

Dec. 23, 1952   J. HANDLEY   2,622,802
TOTALIZATOR SYSTEM
Filed Jan. 21, 1949   13 Sheets-Sheet 2

Inventor
John Handley
By Pennie Edmonds, Morton Barrows & Taylor
Attorneys

Dec. 23, 1952 J. HANDLEY 2,622,802
TOTALIZATOR SYSTEM
Filed Jan. 21, 1949 13 Sheets-Sheet 3

Dec. 23, 1952 J. HANDLEY 2,622,802
TOTALIZATOR SYSTEM
Filed Jan. 21, 1949 13 Sheets-Sheet 4

ODDS ADDING MACHINE CIRCUIT

Inventor
John Handley
By Pennie, Edmunds, Morton, Barrows & Taylor
Attorneys.

Dec. 23, 1952   J. HANDLEY   2,622,802
TOTALIZATOR SYSTEM
Filed Jan. 21, 1949   13 Sheets-Sheet 5

Inventor
John Handley
By Pennie, Edmonds, Morton, Barrows & Taylor
Attorneys

Dec. 23, 1952 — J. HANDLEY — 2,622,802
TOTALIZATOR SYSTEM
Filed Jan. 21, 1949 — 13 Sheets-Sheet 7

Inventor
John Handley
By Pennie, Edmonds, Morton, Barrows & Taylor
Attorneys

Dec. 23, 1952     J. HANDLEY     2,622,802

TOTALIZATOR SYSTEM

Filed Jan. 21, 1949     13 Sheets-Sheet 8

Dec. 23, 1952  J. HANDLEY  2,622,802
TOTALIZATOR SYSTEM
Filed Jan. 21, 1949  13 Sheets-Sheet 9

Dec. 23, 1952      J. HANDLEY      2,622,802
TOTALIZATOR SYSTEM

Filed Jan. 21, 1949      13 Sheets-Sheet 10

Inventor
John Handley
By Pennie, Edmonds, Morton, Barrows & Taylor
Attorneys

Dec. 23, 1952  J. HANDLEY  2,622,802
TOTALIZATOR SYSTEM
Filed Jan. 21, 1949  13 Sheets—Sheet 11

Inventor
John Handley
By Pennie, Edmonds, Morton, Barrows & Taylor
Attorneys

Dec. 23, 1952     J. HANDLEY     2,622,802
TOTALIZATOR SYSTEM

Filed Jan. 21, 1949     13 Sheets-Sheet 12

Inventor
John Handley
By Pennie Edmonds, Morton, Barrows and Taylor
Attorneys

Patented Dec. 23, 1952

2,622,802

UNITED STATES PATENT OFFICE 2,622,802

TOTALIZATOR SYSTEM

John Handley, Purley, England, assignor to The Union Totalisator Company Limited, Glasgow, Scotland, a company of Great Britain and Northern Ireland Application January 21, 1949, Serial No. 71,928
In Great Britain January 21, 1948

17 Claims. (Cl. 235—92)

It is known that betting on racing events is handled by bookmakers who specify the odds at which the bet will be paid at the time it is made, and by the totalisator on which the odds are not decided until the race has been run. The present invention is concerned with a totalisator which specifies the odds to be paid on the tickets as they are sold, and totals the amounts to be paid on all tickets for each competitor on an adding machine allotted to each competitor, totals all the cash taken on all competitors on another adding machine, and varies the odds on the competitors throughout the selling period, so that the amount of cash registered on each competitor, plus a percentage for overheads, approximately equals the total cash taken.

The adding machines allotted to the several competitors will hereinafter be called "odds adding machines" and the adding machine which totals all the cash taken on all competitors will be called "the total stakes adding machine."

To control the odds on the various competitors, post office type selector banks with switching wipers are used. Controlling units driven through differential gears, one side of which are driven by the movements of the odds adding machines which total the payout value of the tickets sold, the other side of which are driven in the opposite direction by the pool total adding machine which adds all the cash taken by sales of tickets are used to operate the odds control switches. So long as the tickets sold on any competitor have a pay-out value equal to the total of cash taken on all competitors, the gears on each side of the differential carrying the switching wipers will rotate in opposite directions at the same speed and the controlling unit will remain stationary.

As soon as a competitor total commences to exceed the pool total, the wipers are advanced to the next row of contacts and mark out a lower ratio of odds for that competitor, so that the totals come into balance again. If a competitor total falls below the pool total, the wipers are retarded and mark out a higher ratio of odds so that the totals of sales and commitments will again come into balance.

The percentage of overheads may be controlled by the ratios of the gear drives from the pool total counter, so that if 16% is to be deducted for overheads and tax, the common differential shaft would be rotated by and 84 toothed gear driving a 100 toothed gear.

These selector switch banks control the price printing of the ticket issuing machines, and the stake selectors for the competitor adding machines.

To reduce the number of wires used to control the odds being printed in the ticket machines, where six competitors are provided for, six groups of five wires, commoned to all ticket issuing machines, may terminate on five wipers of the odds selector banks, and each group of five wires provides control for up to 32 values, through being marked in different combinations of code.

When a competitor key on the ticket issuing machine is depressed (say, competitor 3), the type wheel is rotated to print competitor 3. At the same time No. 3 key, either directly or by operating a relay, gives this machine access to competitor 3 price lines, so that the stake wheel in the machine may rotate to print the price marked on the five wires, from the controlling selector banks.

One method of doing this is by five coding relays which in combination are capable of marking out up to thirty-two different earths, twenty-five being used on the present methods of control.

A selector switch may then be used to drive round the stake type wheel, the "marked" earth holding the switch when it has taken the correct position, and has brought the relevant price type face into printing position.

To add these values, adding machines similar to the type described in our British patent specification No. 592,946, are used, but with a different arrangement of magnets. Counting may be registered on five shafts, (a) the primary shaft, which will register 3d., 6d., 9d., 1/–, 1/3d., 1/6d., and 1/9d., in three-penny units, transmitting to the basic 2/– units shaft after every eight 3d. units have been registered.

For the 3d. units, counting there are three electromagnets, one for 3d., one for 6d., and one for 1/–; then operating these singly, or in combination, all 3d. values up to 1/9d. are transmitted as one impulse.

The 2/– units shaft has six electro-magnets, which count up to nineteen, two shilling units as one impulse, and the tens or £1 shaft also has three electromagnets, to count up to £9 as one impulse.

With all these magnets, any bet may be registered between 3d. to £10: 19: 9d., as a single impulse, by energising one or more of these magnets simultaneously.

All these magnets have their operating leads taken to other banks of the controlling switches, which assume the same positions as marked out by the stake control switches, so that different combinations of magnets are operated according to the positions of these switches.

For instance, if a 2/- ticket is being issued, and the price stakes is 4/9d. the wipers will mark a position where the 4/- magnet of the 2/- units shaft is connected, and the 6d. and the 3d. magnets of the 3d. unit shaft are connected, so that, when an earth is applied to the wipers of this selector by a stake relay, these three magnets will operate and register 4/9d. on the particular aggregator. Assuming that a number of ticket issuing machines are provided for (say 80 maximum), most of these would sell 2/- tickets, some may sell 10/- tickets, and some may sell £1 tickets, and some may sell £5 tickets.

There would then be four different prices transmitted for each competitor.

So far as the ticket issuing machines are concerned, they are all controlled from the same price lines, the different values being printed on the type, that is, if a two shilling ticket issuing machine is printing 4/9d. at a particular time for competitor 3, a ten shilling machine would have its type wheel assume the same position, but could print £1: 3: 9d. or may print 4/9d. per unit and indicate the number of units.

To register the different values on the aggregators, however, two or more stake relays, and additional selector switch banks are used for each competitor. Various values of competitor lines from the ticket issuing machine determine the operation of the stake relays, and price lines are also used which may operate additional relays to multiply bets of high or low stake value.

For example, when competitor 2 key is operated and a ticket machine is set to print a two shilling ticket, an earth is applied to the 2/- stake relays of competitor 2, so that this relay operates, and puts an earth on all the wipers of the 2/- price selector, for competitor 2 aggregator, so that all magnets on this aggregator connected to the level of the selector bank with which the wipers are in contact will operate, and if set to 4/9d., would register 4/9d. on the aggregator as described.

If this were a ticket issuing machine, issuing a 10/- ticket the 10/- stake relay would operate and register £1: 3: 9d. on the aggregator, by energising the £1 magnet, the 2/- magnet, the 1/- magnet, the 6d. magnet and the 3d. magnet.

Similarly, for a £1 ticket the £1 stake relay could operate, earthing the wipers on £1 stake selector, and this could register £2: 7: 6d. by energising a £2 magnet, a 6/- magnet, a 1/- magnet and a 6d. magnet.

For a £5 ticket it could register £11: 17: 6d. by operating a £10 magnet, a £1 magnet, an 8/- magnet, a 6/- magnet, a 2/- magnet, a 1/- magnet and a 6d. magnet.

It has however been considered more economical at the moment to use 2/- unit stake relays and 10/- unit stake relays and obtain higher values by repeating operation of these relays.

The stake relays, in addition to operating the competitor aggregators, put a bet on the pool total aggregator, corresponding to the amount paid for the ticket, so that the pool total aggregator registers all the cash taken by the sellers.

Checking of aggregator operation may be applied by using make contacts on the aggregators, as disclosed in our British patent specification No. 572,103 in which case the stake selectors or additional selectors, working in conjunction with them, would feed the check signal in series with the magnet operated through the stake relay, and back to the ticket issuing machine as a release signal.

Indicators to show the odds on each competitor during the betting period may be controlled direct from the odds control lines.

Provision is made to close sales on any competitor automatically, should its total rise out of the range of the controlling switch, and the betting signal may be diverted to the ticket issuing machines cancel magnets.

To allow bets on various competitors to register simultaneously, and speed up issue, competitors are grouped and a collecting switch allotted to each group, the grand total aggregator having separate magnets for each group.

For instance, if six competitors are catered for, Nos. 1 and 2 may be group one, 3 and 4 group 2, 5 and 6 group 3, and three commutators or collecting switches used, each being assigned to all ticket issuing machines, but only one held to collect a bet which is under control of the particular competitor key operated.

If preferred, the regulation of the odds control switches may come under the control of a supervisor, and the control unit may be used only as an indication to allow the supervisor to adjust the odds control switches by hand.

In this case, the controlling unit will only control the indicator to show the cash difference between these pools at all times, so that the supervisor, in addition to changing the odds, may cut out certain competitors on high value tickets, or in fact have control of all selling machines, to regulate the general, and more particularly, the final balancing up of the adding machines just before the start of the race.

A lock out point on the cash difference indicator may be provided to hold up acceptance of bets instantly, should a rush of heavy betting on a particular competitor give a sudden rise on the indicator, which cannot be dealt with by hand sufficiently quickly.

This hold up may be associated with the ticket issuing machines release signal, so that the machine will wait until bets on other competitors have restored the cash difference indicator sufficiently far to accept the bet, and thus act as a steadying medium on the betting, in preference to cancelling the bets called for.

The supervisor could at his discretion, when about to change the odds, either cancel all ticket issuing machines waiting to send a bet on that particular competitor, or operate a control to prevent further ticket issuing machines setting up on the competitor, allowing ticket issuing machines already set up to clear their bets.

He would then change the odds control, which would change the indicators, and operate a warning bell or announce the change on a loud speaker, or both.

Some or all ticket issuing machines may be coin operated, in which case indication on or near the ticket issuing machines will show the betting odds.

Should the odds be changed whilst coins were being inserted, either a machine will deliver a ticket at the previous odds, or reject the coin, and issue a warning of a change of odds, so that the punters will be able to decide upon the adjusted odds.

A totalisator installation according to the invention is illustrated in the accompanying drawings forming a part of this application.

Figure 9:
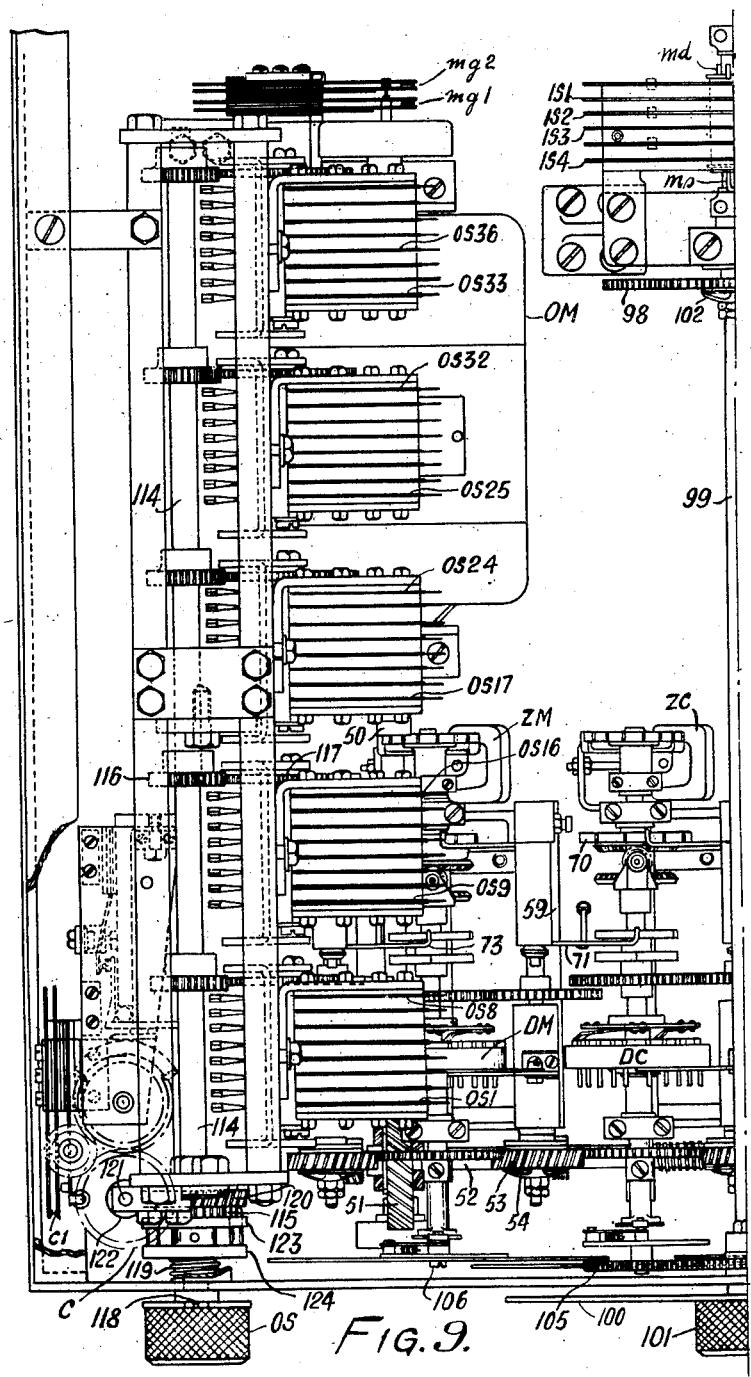
Figure 10:
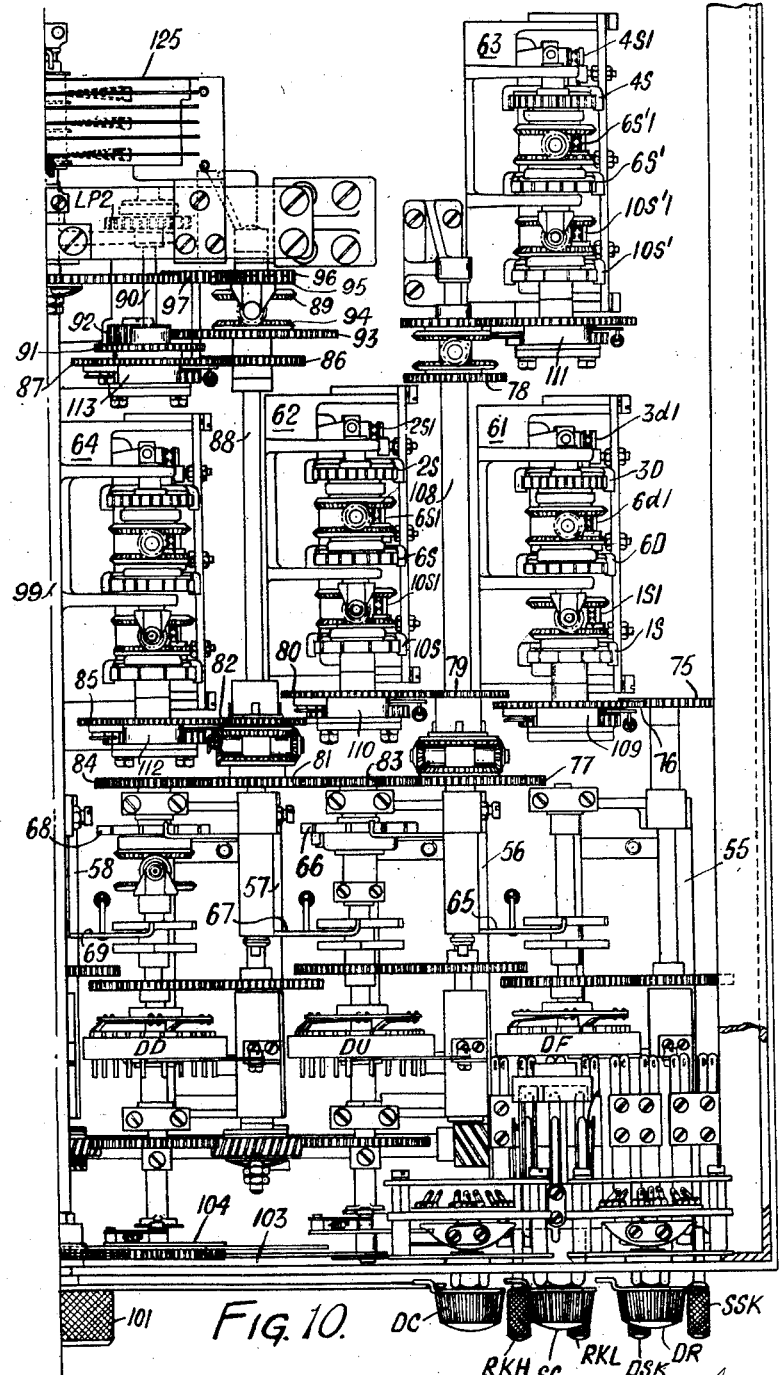
Figure 11:
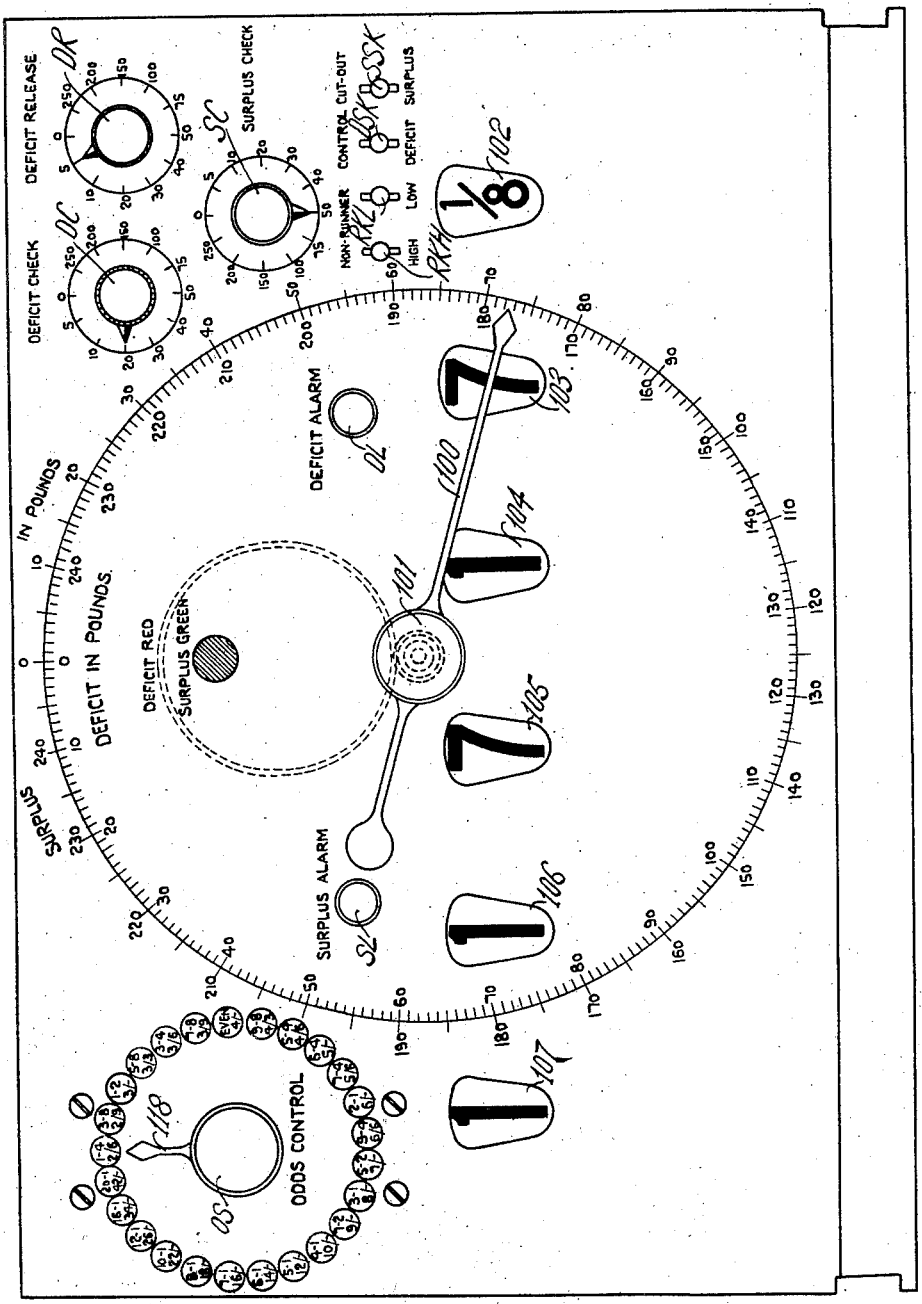
Figure 12:
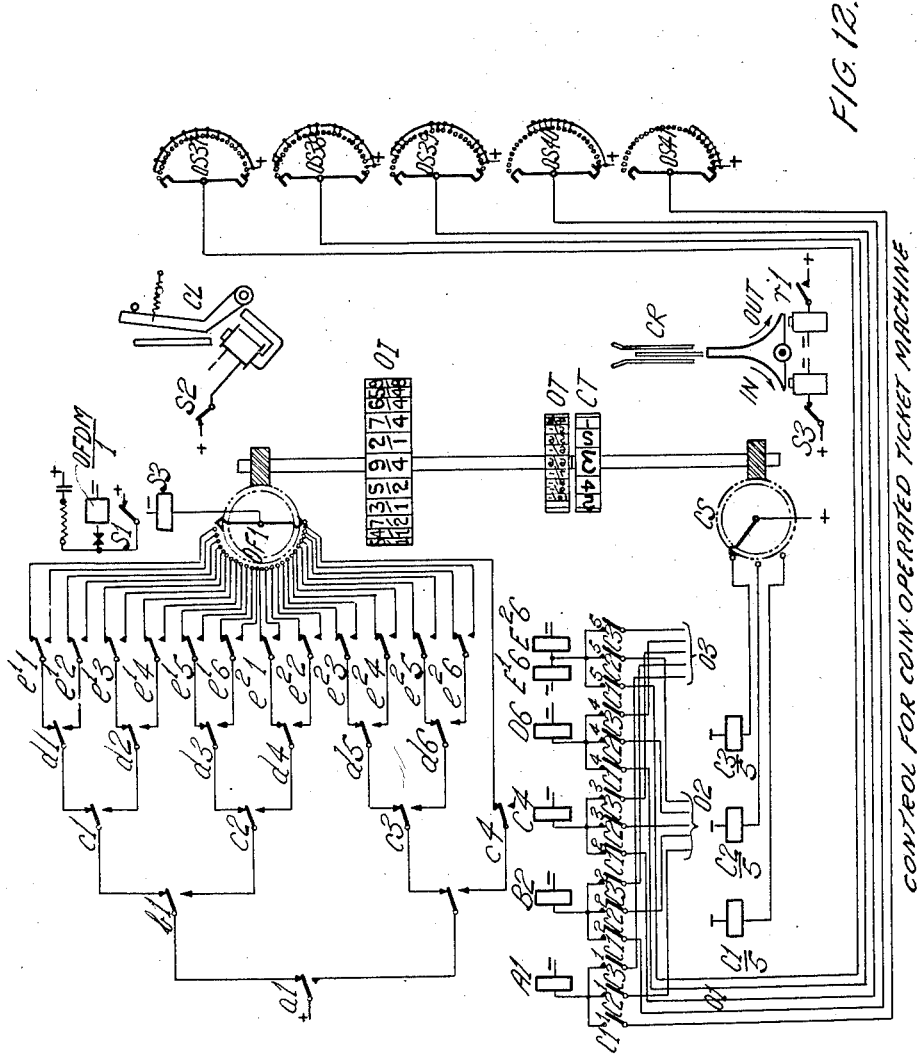
Figure 13:
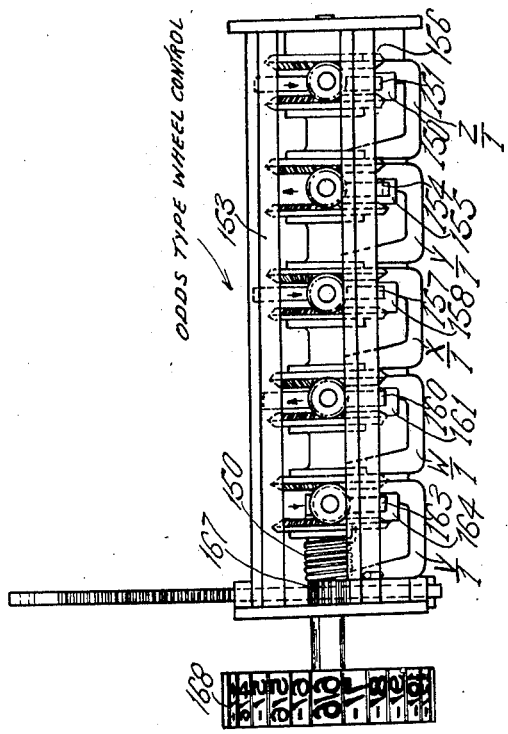
Figure 14:
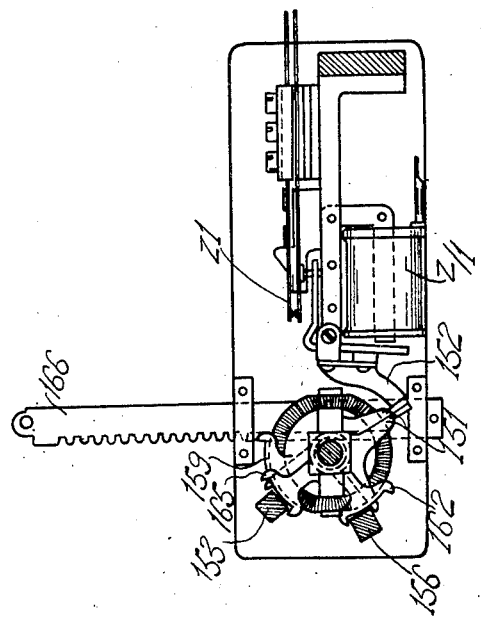
Figure 15:
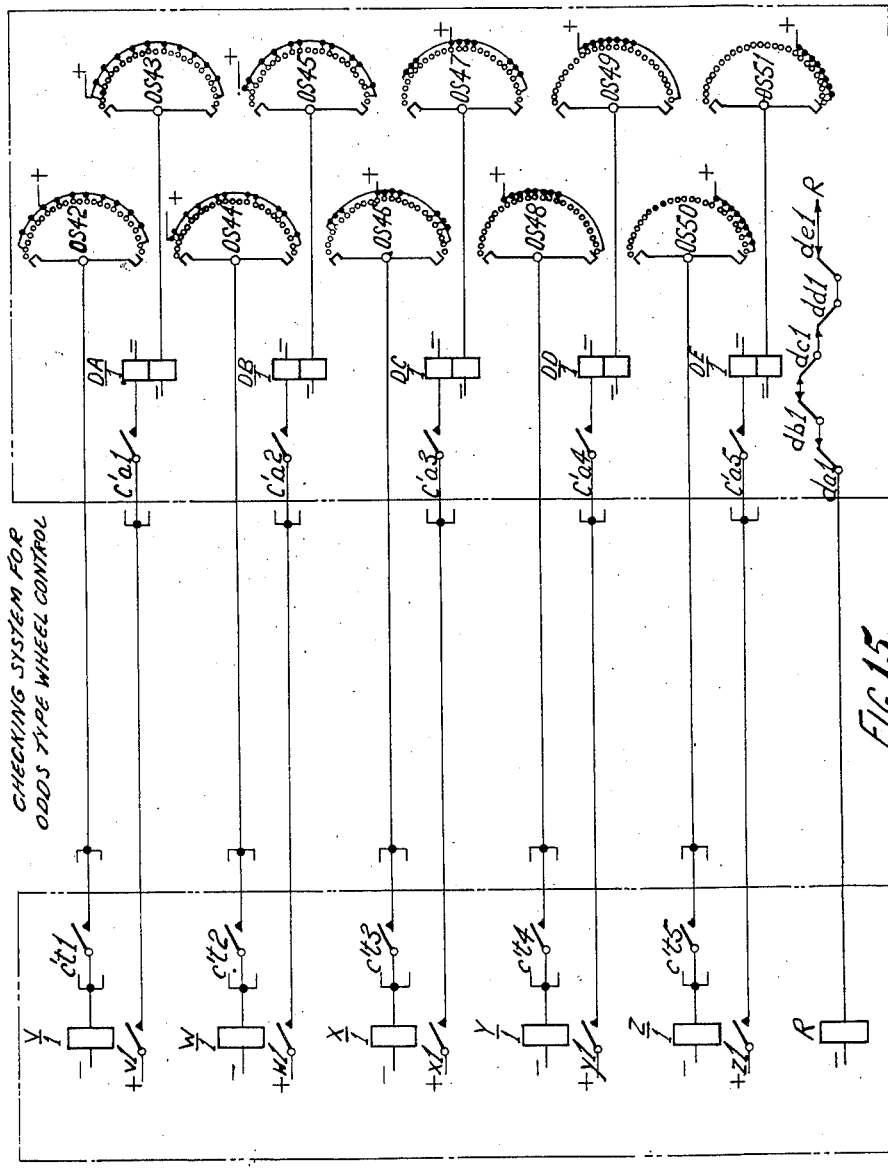

Figs. 9 and 10 when mounted side by side, together form a plan view of an odds adding machine according to my invention, similar to that described in my prior British patent specification No. 372,103;

Fig. 11 is a front view of the odds adding machine showing the controls;

Fig. 12 is a schematic view of a coin-operated ticket machine control in which five wires are used to control the machines for each competitor instead of twenty-five wires as shown in Figs. 1 to 5;

Fig. 13 is an elevational view showing an odds type wheel control device on which five relays operate to control twenty-five type positions;

Fig. 14 is a vertical sectional view of the device shown in Fig. 13 taken to the right of the right-hand relay and looking toward the left;

Fig. 15 is a schematic view showing a checking system to insure that the five relays shown in Fig. 13 have operated in correct combination.

Figure 1:
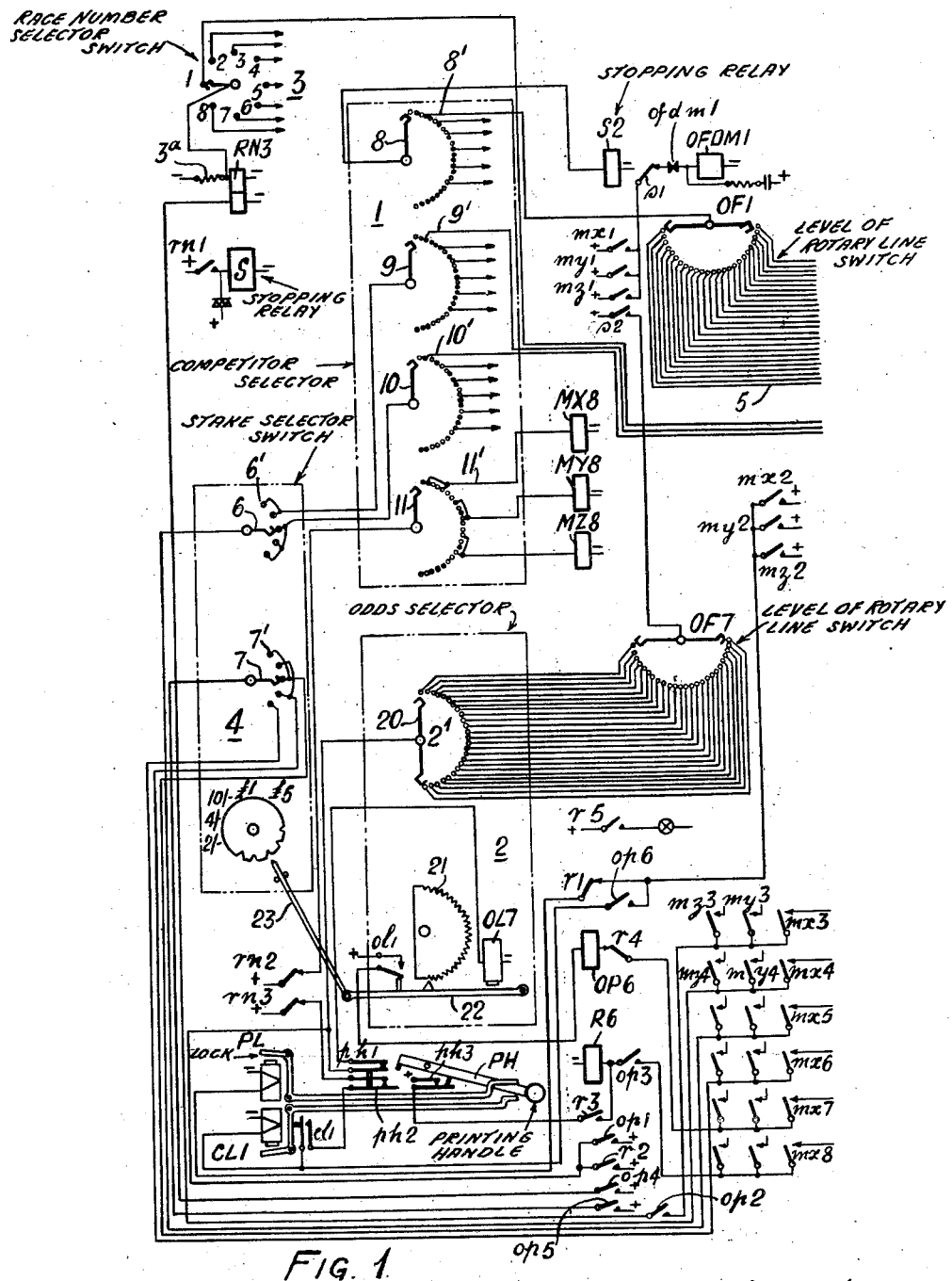
Figs. 1 to 5 are diagrammatic views intended, when placed side by side in a row in succession to form a continuous diagram of the circuit for the totalisator system.

The principal elements and parts of the circuit shown in Figs. 1 to 5 are referred to in general as follows:

Fig. 1 shows the ticket issuing machine circuit of which:

1 is the competitor selector, a manually operated selector which sets the competitor printing wheel and finds the associated circuits through a four level selector bank.

2 is the odds selector which sets the odds printing wheel and locks up when the correct odds is located via its own selector bank.

3 is the race number selector switch which sets the race number printing wheel and restores the race number relay RN3 when it has found an earth at RK (Fig. 2) and shorted out its associated resistance $3a$ releasing the locking solenoid S at $rn1$.

4 is the stake selector switch which sets the stake printing wheel.

Fig. 1 also shows the TIM (ticket issuing machine) control unit circuit, containing a rotary line switch having seven levels OS—OF7, the odds finder OF, a stopping relay S2, three M relays which associate the machine with one or other of the three motor driven switches and counting groups, the OP relay which sends the bet and the R relay which releases the TIM when the bet has been received.

Figure 2:
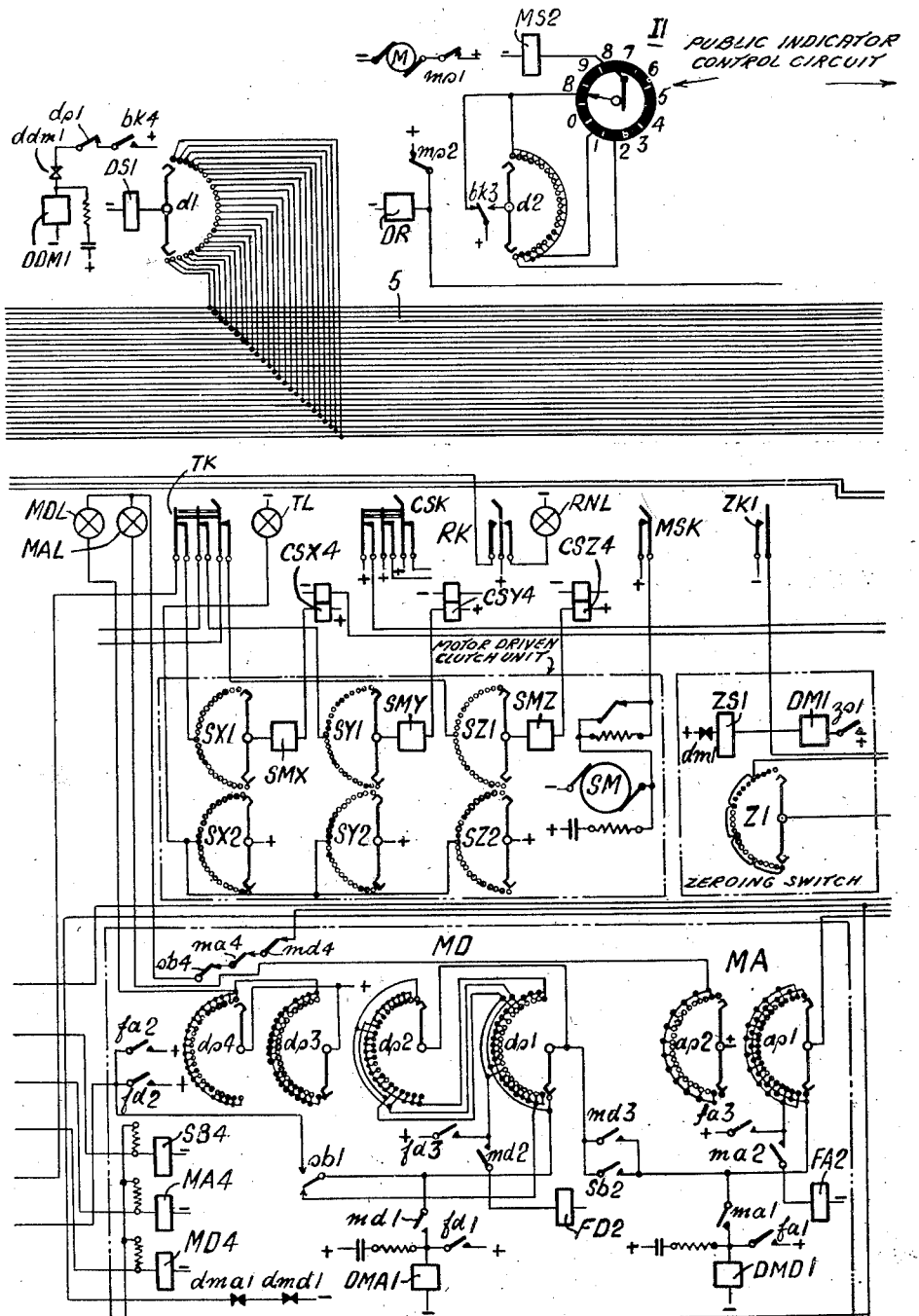

Fig. 2 shows the circuit for the motor driven switch unit which assigns the TIM in turn to the adding machines and contains 3 switch units SX, SY and SZ, driven through slipping clutches from a common motor SM. SX assigns any TIM sending a bet on competitor 1 or competitor 2, SY assigns the competitor 3 or 4, and SZ assigns for competitor 5 or 6, so that three bets may be registered simultaneously.

Fig. 2 also shows a multi-bet counter circuit to cause the bet to be repeated two or ten times when required. The TIMs send a single impulse of 2/- stake value, the low value, or a single impulse of 10/- stake value, the high value so that a repeat on the low value gives 4/- stake value and a repeat on the high value gives one pound stake value. A repeat of times on the high value gives a five pound stake value ticket.

This multi-bet counter is allotted to competitors 1 and 2, another one is provided for competitors 3 and 4, and a third one for 5 and 6.

Figure 3:
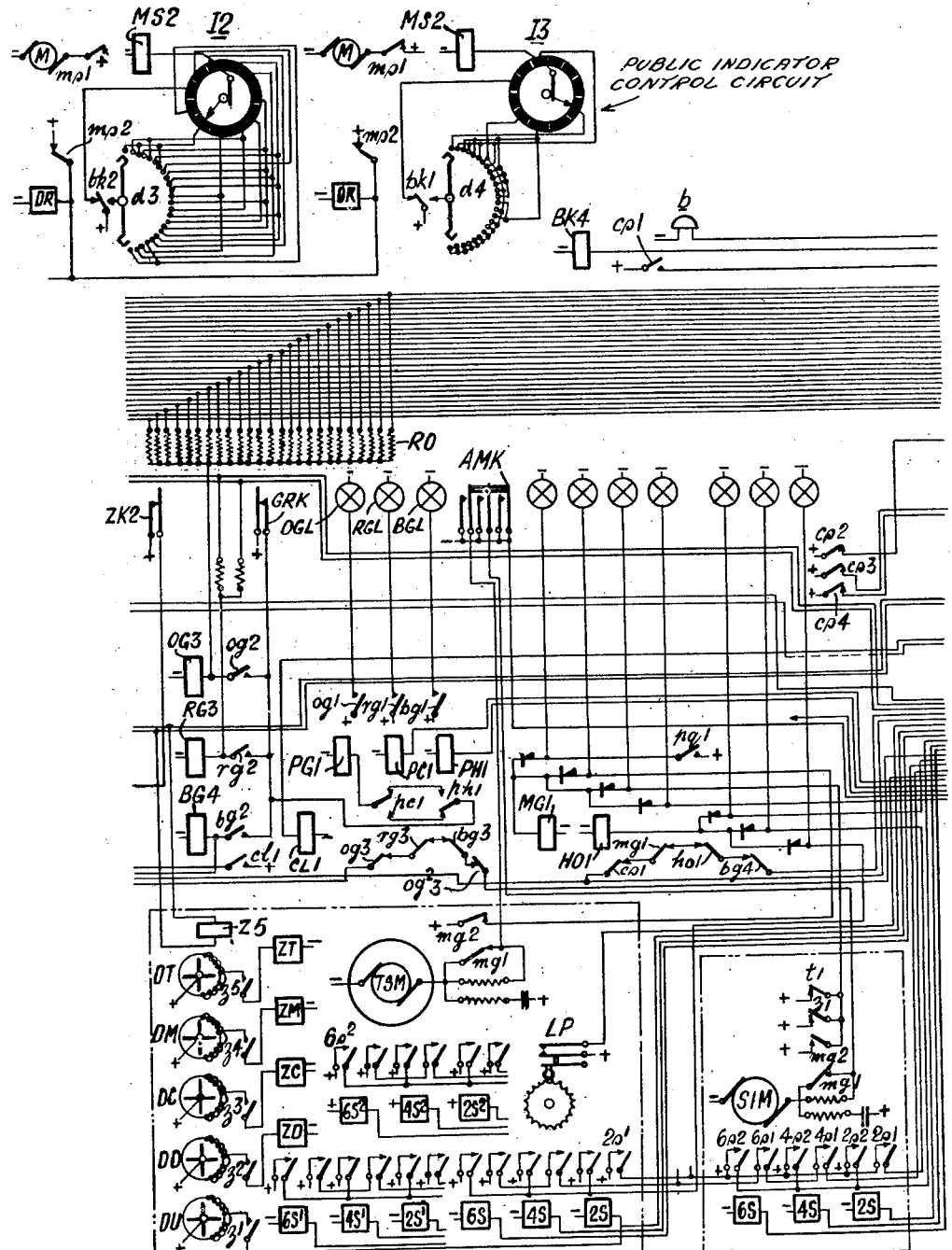

Fig. 3, at the lower left, shows the total stakes counter circuit and has nine counting magnets, three for each group. Magnet $2s$ counts low value or 2/- bets and magnets $4s$ and $6s$ operate together and count 10/- bets all on competitors 1 and 2.

Magnets $2s'$, $4s'$, and $6s'$ count 2/- and 10/- bets on competitors 3 and 4, whilst magnets $2s^2$, $4s^2$ and $6s^2$ count 2/- and 10/- bets on competitors 5 and 6.

Contacts $2s1$ to $6s2$ and the other associated contacts check the operation and restoration of these magnets.

TSM is the total stakes counter's driving motor with governor contacts $mg1$ and alarm contacts $mg2$ to stop betting if the motor slows down or stops.

The LP contacts operated by the associated cam send an impulse to all the odds adding machines for every pound received as stakes.

The distributors DU to DT are provided on each digit and serve only to mark the magnets 2S, ZD, ZC, ZM and ZT when impulsed to zero by relay Z5 closing its contacts $z1$ to $z6$. The four distributor wiper arms each in the form of a cross make contact with the segments at each step until they arrive at the zero position as shown. The distributors make 40 steps per revolution.

Fig. 3 also shows the circuit for the competitor stakes counter number one, at the lower right, and has 3 counting magnets, 2S for 2/- stakes, and 4S and 6S to operate together for 10/- stakes. Contacts $2s1$ to $6s2$ are for checking purposes. Motor SIM has governor contacts $mg1$ and motor guard contacts $mg^2$. This adding machine is mechanically zeorised, and contacts $z1$ guard the reengagement of the drives after zeroising. Contacts $t1$ cause a hold up in betting if the acceptance of bets exceed the speed of the transfer.

Figure 4:
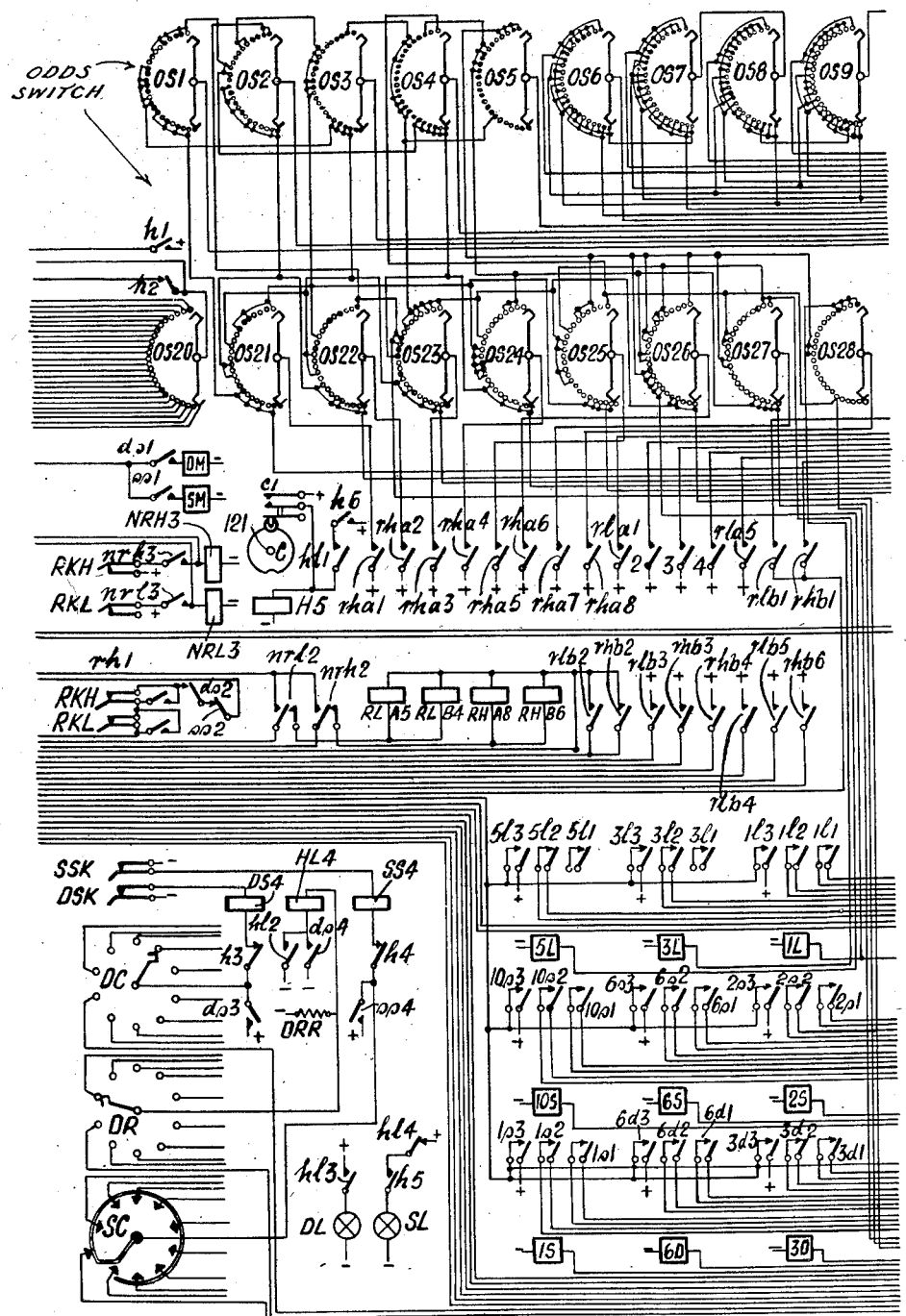

Fig. 4 shows the odds counter circuit for competitor 1 and has 12 counting magnets capable of registering a bet of 2/- stake value or 10/- stake value at 25 different ratios of odds from 1–4 which is 2/6 at 2/- stake value, or 12/6 at 10/- stake value up to 20–1 which is 42/- at 2/- stake value, or 10.10.0. at 10./- stake value.

Figure 5:
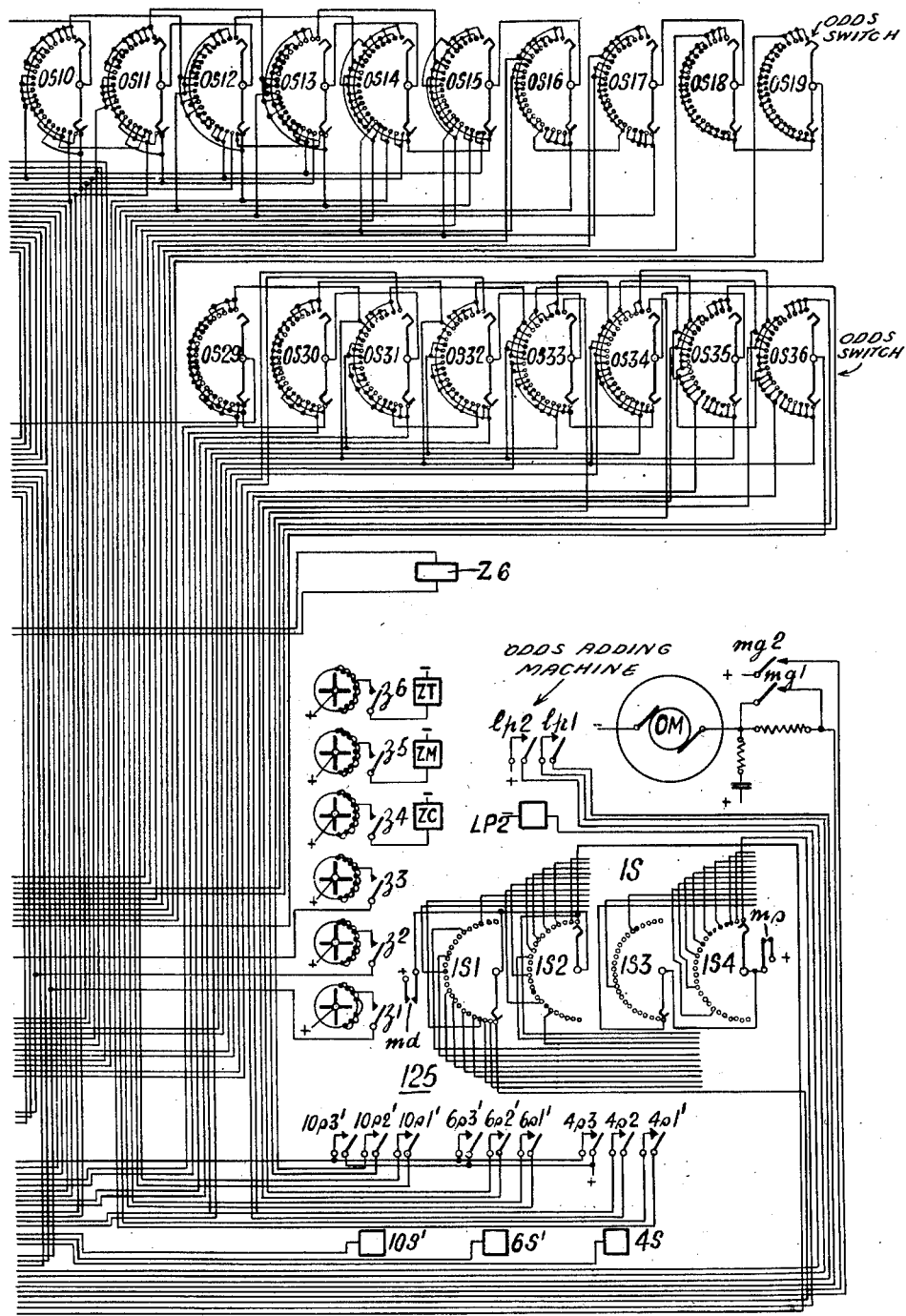

The ratios of odds is determined by the position of the odds switch with 36 levels OS1 to OS36, top of Figs. 4 and 5, which may be manually controlled or may be varied automatically by slipping clutches and escapements released in either direction by magnets DM or SM.

The low value or 2/- stake bets are registered by stake relays RLA and RLB through levels OS1 to OS5 and operation of the counting magnets checked through levels OS19 to OS36.

The high value or 10/- stake bets are registered by stake relays RHA and RHB through levels OS21 to OS28 and operation of the counting magnets checked through levels OS5 to OS19.

Level OS20 of the odds switch marks the odds lead to control the ticket issuing machines and public indicator.

The actual odds chosen with their relative values on 2/- stake basis and 10/- stake basis are as follows:

| | |
|---|---|
| 1-4, 2/6 and 12/6 | 5-2, 7/- and 35/- |
| 3-8, 2/9 and 13/9 | 3-1, 8/- and 40/- |
| 1-2, 3/- and 15/- | 7-2, 9/- and 45/- |
| 5-8, 3/3 and 16/3 | 4-1, 10/- and 50/- |
| 3-4, 3/6 and 17/6 | 5-1, 12/- and 60/- |
| 7-8, 3/9 and 18/9 | 6-1, 14/- and 70/- |
| Even 4/- and 20/- | 7-1, 16/- and 80/- |
| 9-8, 4/3 and 21/3 | 8-1, 18/- and 90/- |
| 5-4, 4/6 and 22/6 | 10-1, 22/- and 110/- |
| 6-4, 5/- and 25/- | 12-1, 26/- and 130/- |
| 7-4, 5/6 and 27/6 | 16-1, 34/- and 170/- |
| 2-1, 6/- and 30/- | 20-1, 42/- and 210/- |
| 9-4, 6/6 and 32/6 | |

The 3d. fractions of units are registered on the fractions shaft through the 3d. 6d. and 1/- magnets 3D, 6D and 1S, up to the value of 1/9.

On the units shaft a 2/- magnet, a 4/- magnet, 2 6/- magnets and 2 10/- magnets, namely, 2S, 6S, 10S, 4S, 6S' and 10S' all operate to register up to 38/-.

On the tens or pounds shaft a £1 or £3 and a £5 magnet namely 1L, 3L and 5L operate to give a total value of 9.

Contacts associated with the counting magnets are provided to insure operation (a separate pair for low and high value on each magnet, except on 3L and 5L which are not required on low value bets) and a third set are provided to insure release of the magnets.

Distributors, Fig. 5, are provided for zeroing purposes, as on Fig. 3, zeroing being effected by magnets 3D, 2S, 1L, ZC, ZM and ZT when operated by the pulsing relay Z5 over contacts z1 to z6. The machine is driven by motor OM.

A cash balance indicator is provided which is rotated through a differential gear from the tens or pounds shaft and this indicates in counter-clockwise direction the odds accepted and promised to pay by the machine on competitor 1 in pounds.

At the other side of the differential gear which rotates the indicator is a gear driven by pound impulses received by magnet LP2 from contacts LP on the total stakes counter, Fig. 3. This gear at the other side of the differential receives its impulses through a reduction gear to reduce its movement by 16% and turns the indicator in clockwise direction, so that if the odds counter has promised to pay £84 and the total stakes counter has received £100 in stakes the indicator will be at zero.

The odds switch may be set by hand and set to pay lower odds if the pointer is showing a deficit or set to higher odds if a large surplus is indicated. If surplus start key SSK and deficit start key DSK are normal, however, the indicator will control this automatically.

Moving with the indicator is a controlling switch IS1 to IS4 wired to the deficit check switch DC, deficit release switch DR and surplus check switch SC.

The wiper assembly of the controlling switch IS is floating on and insulated from the indicator shaft and pushed round by contacts md when the indicator is turning counter-clockwise to deficit and by contacts ms when rotating clockwise to surplus, so that switch DC will only pick up an earth when the indicator is turning to deficit and switches DR and SC will only be effective when the indicator is turning to surplus.

A condition to be borne in mind is that without changing the ratio of odds on a competitor, if it is held up or prevented from taking bets, the stakes being received on other competitors immediately cause its indicator to move to surplus, so that when a deficit is shown it is useful to hold up acceptance on that competitor as well as reduce the odds until the deficit is reduced. On the other hand, if the odds are too low and a surplus is being shown, it is necessary to raise the odds without delay, as delay increases the surplus.

The controls DC, DR and SC are set to allow the necessary limits to give flexibility and these limits will be opened up for the larger part of the betting period and reduced towards close sales.

Relay DS3 and SS4 operate to start the operation of lowering and raising the odds by operating magnets DM and SM, during which time sales are held up automatically, first by taking the earth off a close sales relay and then by H5 relay operated by rotation of cam C whilst the odds are changing; H5 taking the earth OS20 at h2 and ringing a warning bell b at h1.

NRH and NRL high and low value runner relays divert the bet to cancel the machine. A separate relay for high or low value is provided so that high value bets may be cut out to steady the odds just before close of sales.

Figs. 2 and 3 show the control apparatus, comprising keys signal lamps and guard relays extending through the mid-portions of these views.

The three close sales relays CSX, Y and Z have two windings each, a hold winding in series with the stopping magnets SMX, Y and Z to ensure them remaining operated until the completion of a bet. Relays OG, RG, BG and PG are guards. OG guards the odds lines for competitor 1 and operates if an earth is placed on more than one odds line through resistances RO each 1000 ohms. The guard relays are 50 ohms and marginal in operation. If they are fed through two RO's in parallel they receive a higher potential and lock up, and hold on key GRK. RG guards the high and the low value lines on competitors 1 and 2. BG guards the multi-bet counter wires for competitors 1 and 2 and ensures that the switches as and ds (Fig. 2) are normal after each bet when SB, MA and MD have restored, and lights lamps MDL or MAL (Fig. 2) if they are not normal.

PG guards the pound pulses from LP contacts, Fig. 5, and ensures the LP2 (Fig. 5) has operated on each odds counter as all lp1 contacts are wired in series and must close to operate relay PC, whereas lp2 contacts are commoned and any lp2 will operate relay PH but PH will not release until all lp2 contacts have opened. Unless PC and PH operate together, PG will operate via pc1, ph1 and operate MG1 at pq1.

MG1 is the motor guard relay and also operates if the total stakes, competitor stakes, or an odds stakes motor fails.

Operation of OG, RG and BG would come as a result of a bet being sent and therefore they break the R circuit to prevent the machine being released or the bet being repeated so that the supervisory indication may be studied and the fault located.

Operation of PG, MG or HO are conditions left on after a bet is sent and prevent another bet coming on by breaking the battery feed from the multi-bet counter to the relays RLA, etc., on the odds adding machine.

Figs. 2 and 3 also show at the top the public indicator control circuit. The display switch d1, d2, d3, d4 operated by DDM1 hunts until the earth is found, marked by OS20 of the odds control switch and then operates relay DS1, which breaks the feed at ds1 contacts. The blank relay BK remains operated so long as an earth is provided via cs1 and h2 to OS20.

Three indicators I1, I2, and I3 are used for each competitor to indicate say 16-1 the switch would have stepped round to the 24th position, the last but one contact in clockwise direction on earth would be fed to position 1 on distributor I1, via bk3, d2, also to position 6 on distributor I2 via bk2, d3 to position 1 on distributor I3 via bk1, d4. The three motors M rotate until the wipers operate relays MS2 which stop the motors at contacts ms1 and release the display restoring magnets DR at ms2 contacts when all three MS2 relays have operated.

Immediately the earth is taken off the odds lines at cs1 or h2, relay BK4 restores changing over bk1, bk2 and bk3 and all indicators move to blank position B. Contact bk4 prevents the switch from continuous hunting.

Fig. 2 also shows a zeroing switch for the adding machines and this sends impulses to the pulsing relays on the adding machines where ZK1 and ZK2 keys are both held down. Two keys are used as a precaution against misuse whilst betting is in progress.

To enable the invention to be more fully understood the operation will now be described with reference to the drawings.

The motor-driven switch key MSK, Fig. 2, and the adding machines motor key AMK (Fig. 3) are thrown, so that motors SM, Fig. 2, TSM, Fig. 3, SIM, Fig. 3 and OM, Fig. 5, commence to rotate. The adding machine motors in Figs. 3 and 5 drive their clutch shafts, but the counting shafts do not rotate until bets are transmitted which operate magnet 2S to 6S in the total stakes counter circuit, 2S to 6S in the competitor stakes counter (Fig. 3), and 3D to 5L on Fig. 4. On Fig. 2 the motor driven switch, wipers SX1 to SZ2 rotate continuously.

The odds control switch OS, Figs. 9 and 11, operating on the levels OS20 to OS36, Figs. 4 and 5, is set (by rotating) to a suitable value for each competitor.

The close sales key CSK is restored to normal as shown, Fig. 2, and this operates the close sales relays CSX to CSZ. Keys RKH and RKL on each odds adding machine are thrown, see Fig. 4. CSX is common to adding machines for competitors 1 and 2, CSY is for competitors 3 and 4, CSZ is for competitors 5 and 6.

The contact cs1 (Fig. 3) has closed, putting positive into one of the control lines 5 for the indicator and ticket issuing machine, via switch level OS20 and has also operated the blank control relay BK4 which operates contacts bk1, bk2, bk3 and bk4 (Figs. 2 and 3). Contact bk4 energises the indicator control switch magnet DDM1 which hunts via its interruptor contacts ddm1 until its wipers d1 find the marked wire of the control lines 5 when relay DS1 operates, stopping the switch by opening contact ds1.

Wipers d2, d3 and d4 are now marking a segment on the indicator distributors I1, I2 and I3, the three relays MS2 have restored, closing motor contacts ms1 causing the indicator motors M to rotate until the marked distributor segment is found when the MS2 relays operate and stop the indicators. The display restoring magnets DR cause the indicators to show blank when any one is rotating but restores all indicators to display their numerals when all three relays MS2 have operated and opened their contacts ms2 as shown. The indicator display numerals 0 to 9 and blank B are shown and are similar to those shown in our prior British patent specification No. 441,063.

A race number key RK, Fig. 2, is thrown which puts positive on to the wire corresponding to race number one. Ticket machine operators then turn the race control switch 3 (Fig. 1) until the marked wire is found, at which point relay RN3 has its resistance 3a shorted out so that it restores and opens contact rn1 which releases the solenoid S to unlock the machine. Contacts rn2 and rn3 (Fig. 1) close. The totalisator is now ready to accept bets.

I propose to take a 2/- bet on competitor one and assume that the odds control switch OS, Fig. 11, is set at 7 to 8 or 3/9d. This is the sixth position on the control switch and therefore the switches OS1 to OS36 (Figs. 4 and 5) will be turned in a clockwise direction to the sixth point. As 2/- bets are of low value they are applied to the counting magnets 3D to 5L of the odds adding machine, Fig. 4, via levels OS1 to OS5 and operation of the low value magnets are checked over levels OS29 to OS36, and contacts 3d2 to 1l2.

To check that in the sixth position of the switch a value of 3/9 can be registered on the odds adding machine, look first at the switch level OS1 and count round from the bottom contact in clockwise direction; it will be seen that the sixth point marks a line down to level OS21 and then down to magnet 3D so that if an earth is applied to the wiper of OS1, magnet 3D will operate and this will register 3d. on the adding machine. Next take level OS2. In the sixth position a line is marked which goes down to level OS22 and then down to magnet 6D to register 6d. on the odds adding machine. Similarly level OS3 finds an outlet to 1S magnet and registers 1/-, and OS4 finds an outlet to 2S magnet and registers 2/-. Level OS5 has no outlet in the sixth position so that the amount registered is 3d.+6d.+1/-+2/- which is 3/9 as required. Low value bets are applied by operation of relays RLA5 and RLB4. Wipers OS1 to OS5 are fed by contacts rla1 to rla5 (Fig. 4) which cause the odds value to be registered on the odds adding machine. As this bet is registered, contacts rlb3 apply a positive to magnet 2S on the total stakes adding machine Fig. 5 and register 2/- on the total stakes adding machine and contacts rlb4 apply a positive to magnet 2S on the competitor stakes adding machine, Fig. 3.

Figures 7, 8:
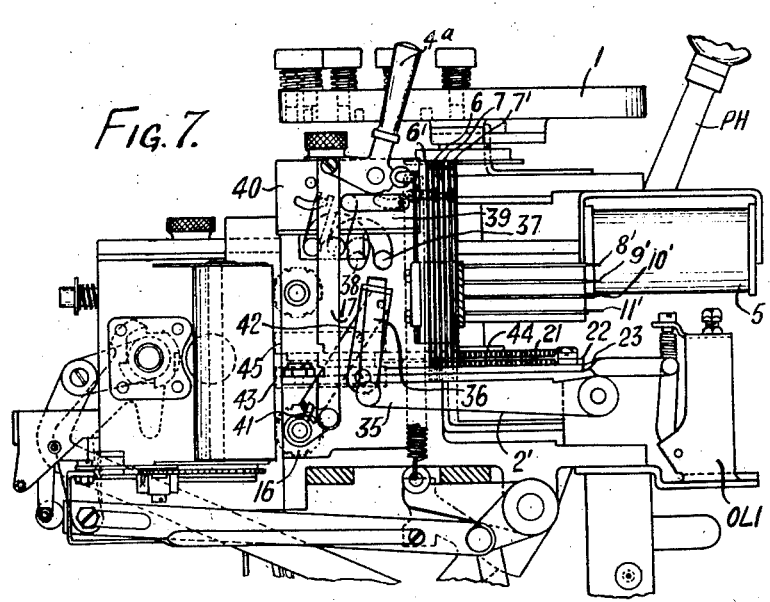
Fig. 7 is a side view of the ticket issuing machine shown in Fig. 6 viewed from the left.
Fig. 8 is a side view of the ticket issuing machine shown in Fig. 6 viewed from the right.

A series check circuit is established to check the operation of all these magnets and this originates at the total stakes adding machine, Fig. 3, contacts 2S1 through also contacts 2s1 of the competitor stakes adding machine, to the odds control switch level OS36 wipers and out through the bank (sixth position as before) down to contacts 2S2 and back to OS35, through its wipers out to wipers OS34 and out to contacts 1s2, and back to level OS33, through the wipers to wipers OS32; from this bank to contacts 6d2 and back to OS31, through wipers to OS30 and down to contacts 3d2 back to bank OS29 and out to contacts rlb1 to become the release lead through contacts og²3, bg3, rg3, og3, Fig. 8, to the multi-bet counter as1, Fig. 4.

Having now established that with the odds control switch set to the sixth position, operation of relays RLA and RLB will cause a bet to be registered on the odds adding machine at 3/9d., a stake of 2/- to be registered on the total stake adding machine and a 2/- stake to be registered on the competitor adding machine, we will send the bet by setting up the ticket issuing machine, Figs. 1, 6, 7 and 8.

Figure 6:
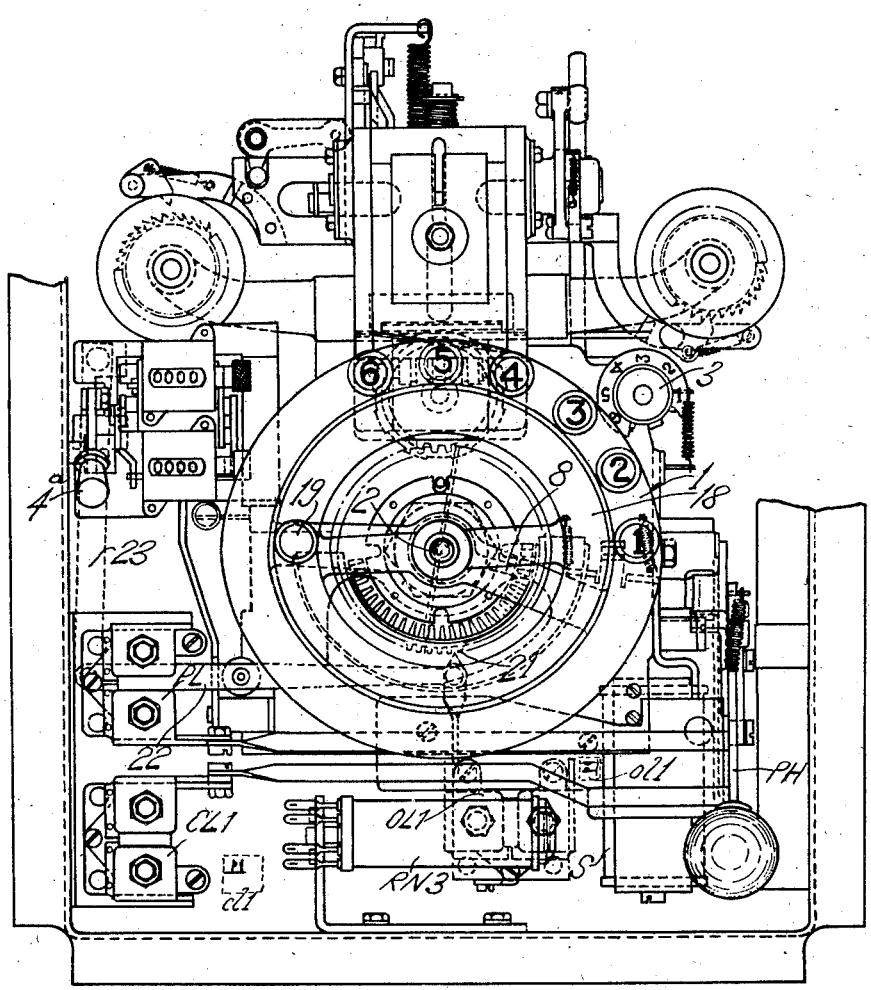
Fig. 6 is a plan view of a ticket printing and issuing machine according to the invention which is similar to that described in my prior British patent specifications Nos. 455,133 and 455,134.

The stake control device 4 (Fig. 1) is set by a handle 4a to the 2/- position so that the wipers 6 and 7 rest on their first contacts 6' and 7'. The competitor selector 1 is then rotated until its wipers 8, 9, 10 and 11 engage outlets 8', 9', 10' and 11' at which point the plunger 12, Fig. 8, trips the lock plate 14 and releases the bolt 15 to lock the outer selector wheel of the TIM. (To avoid confusion it is necessary to explain that although in the schematic diagram, Fig. 1, the stake control 4 shows provision for five values, namely 2/-, 4/-, 10/-, £1 and £5, the machine in use as illustrated in Figs. 6, 7 and 8 only has two values, the intention being to modify existing types of machines to begin with and build special machines with all values at a later date. All the values on the system will at this stage be used on different machines by building them into three types. (a) 2/- and 10/- type, (b) 4/- and £1 type, (c) £1 to £5 type. In the illustrated machine the device 4a controls the stake type roller 16, Fig. 7, through link 17, and the change-over contacts 6, 6', and 7, 7', control the electrical circuits.)

Referring again to Fig. 1, the selector has been set to competitor one position and relay MX8 has operated, closing contacts $mx1$ of the odds finder driving magnet OFDM1. This is a seven level rotary line switch but levels OF2 to OF6 (to which the odds control lines, similar to lines 5 for competitors 2 to 6 are wired) are not shown.

OFDM1 then steps the wipers round until OF1 has found the earthed contact which we have made the sixth contact, now in counterclockwise direction, when relay S2 is energised via OF1, 8' and 8, opening contacts $s1$ and stopping the switch. Operation of S2 also closes contacts $s2$, putting an earth on OF7 the selector bank 2' of the odds selector 2 also on the sixth position, now clockwise again.

Contacts $mx2$ have energised the printing handle lock PL to prevent operation of the machine. Next the dial 18 of the odds selector 2 is rotated by key 19 (Fig. 6) until the wipers 20 find the earthed contact when the odds locking magnet OL1 is energised via the printing handle contacts $ph1$, wiper 20, wiper OF7, and contact $s2$. This locks the odds selector 2 in gear 21 by lever 22, locks the stake control 4 by link 23 and closes contacts $ol1$.

Closing of contacts $ol1$ provides a circuit via the winding of relay OP6 contacts $r4$ contacts $mx7$, and ticket machine isolating key TK (Fig. 2) to bank SX1 of the motor driven switch, Fig. 2, which is continuously rotating. When the wipers arrive at the contact to which the set up machine is wired, the circuit is completed via SMX (Fig. 2) and CSX4 (Fig. 2), and SMX operates and clutches into a ratchet wheel on SX1 and arrests the wipers. At the same time OP6 operates to send the bet. Contacts $ol1$ closing lock up OL7.

Contacts $op2$ closing prepares a circuit to the cancel relays contacts $cl1$, Fig. 8, in case the competitor selected is a non-runner.

Contacts $op3$ prepare the release circuit to operate R5 when the bet has been accepted.

Contacts $op4$ operate the single bet relay SB4 of the multi-bet counter, Fig. 2, via wiper 7 and contact 7' of the stake selector 4 and contacts $mx4$.

Contacts $op5$ operate the relays RLA5, RLB4 of the odds counting machine, Fig. 5, via wiper 6 and contact 6' of the stake selector 4, wiper 9 and contact 9' of the competitor selector 1 and contacts $nr12$ of the non-runner relay NRL3 in the odds adding machine. Contacts $op6$ operate cancel lock CL1. The bet is now registered as previously described and the release signal sent back through contact $og23$, $bg3$, $rg3$, $og3$, Fig. 3, to wipers $as1$, Fig. 2, through contacts $sb2$, wipers $ds1$, contacts $sb1$, Fig. 4, $mx8$, and $op3$ to operate R5, Fig. 2. R5 operating locks up over $r3$ and $ph3$.

Contacts $r1$ release the printing handle lock PL.

Contacts $r2$ continue to hold OL1 whilst $r4$ releases relay OP6, and $r5$ lights a lamp to signal that the ticket may be printed.

The printing handle PH is then operated to print and issue the ticket, releasing OL1 and CL1 at $ph1$ and $ph2$ when the handle is pulled forward, and releasing R5 when it has fully returned and issues the ticket.

To take a £1 bet (which represents a two unit bet at high value, high value being 10/- unit value) and assuming that the odds switch OS is set at twenty to one, this is an odds value of 42/- on a 2/- unit or £10. 10. 0d. on high value of 10/- per unit.

We will first examine the odds adding machine (Figs. 4 and 5) and trace the registration of the bet.

Referring again to the odds switch, the 20 to 1 setting is the last contact, turning the switch in a clockwise direction and therefore the top contact looking at the diagram (Fig. 4), and high value bets are transmitted through levels OS21 to OS26.

To check that a value of £10. 10. 0d. will be registered on the aggregator with the switch in the 25th position look first at the top contact level OS21 (that is the last contact when passing over them in a clockwise direction). It will be noted that this lead connects with other contacts which are not being marked by wipers on levels OS22, OS24 and OS25, and terminates on magnet 6S which is a 6/- magnet and will operate when an earth is applied to wiper OS21.

Next take level OS22, and note that the 25th point is wired to OS23 and down to magnet 10S which is a 10/- magnet.

The 25th contact on level OS23 finds its way down to magnet 4S the 4/- magnet. The 25th contact on level OS24 is not wired. The 25th contact on level OS25 goes down to 10S' magnet, another 10/- magnet. The 25th contact on level OS26 goes down to magnet 1L the £1 magnet. The 25th contact on OS27 goes down to magnet 3L the £3 magnet and the 25th contact on OS28 connects to magnet 5L the £5 magnet.

These magnets 6/-+10/-+4/-+10/-+£1+£3 +£5 effect a total registration of £10. 10. 0d. as can be observed.

High value bets are applied by relays RHA8 and RHB6. Wipers OS21 to OS28 are fed by contacts $rha1$ to $rha8$, which cause the odds value to be registered on the odds adding machine.

As this bet is registered, contacts $rhb3$ and $rhb4$ operate magnets 4S and 6S values 4/- and 6/- on the total stakes adding machine (Fig. 3) and register a 10/- stake.

At the same time contacts $rhb5$ and $rhb6$ operate magnets 4S and 6S on the competitor stakes adding machine, Fig. 3, and registers a 10/- stake.

As before a series check is established to check the operation of all these magnets, which originates at the total stakes adding machine, Fig. 3, contacts 6sl and 4sl and on to contacts 6sl and 4sl and on to the odds adding machine, Fig. 5, wipers OS19 out to contacts 5*l*l and back to level OS18, through wipers to OS17 and out contacts 3*l*l, back to bank OS16, through wipers to OS15 and out to contacts 1*l*l and back to level OS14 through wipers to OS13 and out to contacts 10sl', and back to level OS12, through wipers to OS11 and out to contacts 4sl and back to level OS10 through wipers to OS9 and out to contact 10sl and back to level OS8, through wipers to OS7 and out to contacts 6sl and back to level OS6 and through wipers to relay contacts rhbl and to become the release lead as before, to pass through the multi-bet counter, Fig. 2, to relay R6, Fig. 2.

We shall now send a £1 bet from the ticket issuing machine.

The stake control 4, Fig. 1, is moved round in clockwise direction until the wipers 6 and 7 have reached the fourth contacts on the stake control switch. Then, when the machine is operated to send a bet as before, relay OP6 operates, and the closure of contacts OP4 puts on earth via wiper 7 and contacts mx5 to ray MA4 of the multi-bet counter, Fig. 4, and also contact op5 puts out an earth via wiper 6 on the stake control 4, through wiper 10 and line 10' of the competitor selector 1, Fig. 1, to operate relays RHA8 and RHB6, Fig. 4, to register a bet of 10/- stake value.

The machine has been set to send a £1 bet and therefore the 10/- bet registered must be repeated. This function is caused by the multi-bet counter, Fig. 4. When the 10/- bet has registered, the release signal which was completed and passes from the relay contacts rhbl, Fig. 4, out through og²3, bg3, rg3, og3, Fig. 3, into the multi-bet counter, Fig. 2, to wipers asl contacts mal to energise the selector magnet DMD1. The relay MA4 was operated from the ticket machine. Operation of DMD1 breaks the battery feed to relays RLA5, RLB4, RHA8, and RHB6, Fig. 4, so that the adding machines restore and the release signal is interrupted. DMD1 restores and steps the wipers asl, as2 onto the next contact. Contacts dmd1 close and relays RHA8 and RHB6 again operate and register another bet of 10/- stake value on the total stakes adding machine and the competitor stakes adding machine, and a further £10. 10. 0 on the odds adding machine of the selected competitor.

As a result a second release signal is applied and this comes into the multi-bet counter, Fig. 2, at asl which is on the second contact via ma2 to operate relay FA2. Contacts fal again energise DMD1, contacts fa2 send a release signal to the relay R6 via contacts mx3, Fig. 1, and the machine is released to issue its ticket and the switch wipers asl, as2, step on to their third contacts.

Should these wipers fail to step on to an even numbered contact before the relays SB4, MA4, or MD4 have restored, an earth from as2 or ds3 and ds4 will light lamp, Fig. 3, via contacts sb4, ma4, and md4, Fig. 4. BG4 is a marginal relay and if more than one of the three relays SB4 to MD4 is operated BG4 will come up via the resistances associated with the relays SB4 to MD4. Once operated BG4 locks up over its own make contacts bg2 and common release key GRK. Had the ticket machine been set to send a bet of £5 stake value, it would be necessary to repeat the 10/- bet, ten times. For this to take place, the stake control 4, Fig. 1, is set to the last contact, and wiper 7 puts an earth out via mx6, Fig. 2, to MD4, Fig. 2.

In this case the release signal comes into asl, Fig. 2, through md3, dsl, md1 and energises DMA1 interrupting relays RHA8 and RHB6 at dmd1. DMA1 restores and steps wipers dsl to ds4 on to their next contacts, and the next 10/- bet is registered and the release signal passes through dsl, sbl and md1 to DMA1, and the bet continues to repeat until the wiper dsl has reached its tenth contact when the relay FD2 is operated via md2 contacts, when contacts fd2 send a release signal to the ticket isuing machine.

Two additional marginal guard relays are used, the runner guard RG3 (Fig. 3) which operates via the resistances shown if an earth is applied to move than one runner or competitor lead of higher or lower value at the same time, and also the odds guard OG3 which operates if an earth appears on more than one odds lead at the same time.

Operation of any of these three guard relays breaks the release lead back to the machine so that operation is held up and the fault indicated by supervisory lamps shown OGL, RGL, MDL, MAL and TL which indicates which machine is betting.

Another guard relay HO1 is operated by the third pair of check contacts on all adding machine magnets and this operates and does not restore until all adding machine magnets are clear. This relay breaks the battery feed to relays RLA5, RLB4, RHA8, RHB6, but if these relays have operated their feed is maintained via their own make contacts over a secondary feedwire. Thus, once the relays have operated to send a bet, operation of HO1 will not be effective until they have restored, but a further bet will be held off until HO1 has restored.

Another guard relay MG1 (Fig. 3) or motor guard performs a similar function if any adding machine motor slows down so that its guard contacts on the governor (mg2 in each case) will close and operate MG1.

Close sale relays which are associated with the motor driven switch, and a pulse guard relay PG1 which will be described later effect control on the same wire, the contacts in series to perform this function being csl, mg1, ho1, and bg4.

To zeroise the odds adding machine, Figs. 4 and 5, and the total stakes adding machine, Fig. 3, a rotary line switch Z1, Fig. 2, is started by operating keys ZK1 and ZK2 (Fig. 3) and this switch impulses relay Z5, Fig. 3, and Z6, Fig. 7. In Fig. 3, relay Z5 operates contacts zl to z5, impulsing magnets 2S, ZD, ZC, ZM and ZT, until the distributors DU to DT are in the zero position as shown when no further earth is found to operate these magnets. In the case of the odds adding machine (Figs. 4 and 5), relay Z6 operates zl to z6 energising magnets 3D, 2S, 1L, ZC, ZM, and ZT, until the distributors are all at zero when no earth is marked in the distributors.

To enable the money registered as odds on the odds adding machine to be compared with the money registered as stakes on the total stakes adding machine, an impulsing cam LP on the stakes adding machine, Fig. 3, sends an impulse to the magnet LP2 on each of the odds adding machines for each £1 or ten 2/- units received by the total stakes adding machine.

The odds adding machine, Figs. 9, 10 and 11, carries four counting units 61, 62, 63 and 64 for registering odds values. These register all the various values of odds on their counting magnets, the lowest value being 3d or 1/8 of a unit and registered by magnet 3D and the highest being £5 or 50 units and registered on magnet 5L.

The odds adding machine is driven by motor OM (Figs. 5 and 9) through shaft 50 driving gear 51 on shaft 52 which engages several gears such as 53 which urge their shafts to rotate through friction clutches such as 54. The transmission units which receive movements from the counting units are, 55 the fractions of units, transmission unit, 56 which receives units, 57 which receives tens of units or pounds, and 58, 59 and 60 which are progressively operated as each lower unit counts ten through transfer levers 69, 71 and 73 releasing ratchet wheel 70, 72, 74. Auxiliary driving shafts and clutches run under gear 75, shaft 100 and shaft 83, and apply a driving torque to gears 76, 77, 78, 81, 82 and 86, which are released to rotate when the counting magnets 3D to 5L operate and release any of the pawls 109, 110, 111 or 112, which release and engage again in their fixed ratchet wheels when their associated gears have rotated the same amount as has been released by the counting magnets escapements.

Except a remainder (which will not exceed £1 in this case, it is shown on Fig. 15 as 7 1/8 units which is 14/3d.), all money registered on the odds adding machine (Figs. 10 and 11), rotates shaft 88, one-fortieth of a revolution for every £1 registered. Crown wheel 89 rotates with shaft 88. This through the differential rotates gears 95, 96, 97 and 98, shaft 99 and pointer 100 (see also Fig. 11) in counterclockwise directions, registering deficit in pounds as shown on the dial.

Whilst odds values are being registered on this odds adding machine (Figs. 10 and 11) for its particular competitor, stakes on all competitors are being registered on the total stakes adding machine, Fig. 3, and for every pound received an impulse is being transmitted to the magnet LP2 (Fig. 11) which in turn rotates shaft 90, releasing pawl 113 upon which gear 91 (fixed to gear 87 which is urged by a clutch drive, not seen, through idler gear 86) rotates intermediate gear 92, gear 93 and crown wheel 94 to turn the differential and intermediate gears 95, 96 and 97 and 98 to rotate the pointer 100, in counterclockwise direction. The ratio of gears 91 and 93 is such that, when one hundred £1 impulses have been received by the magnet LP2, only eighty-four pounds surplus are registered on the dial. This is to allow a deduction of 16% for running costs and tax, but it may be varied to suit any ratio by altering the ratios of gears 91 and 93 and moving the position of the spigot on which gear 92 rotates, this spigot being adjustable.

It will therefore be understood that in this machine, if one hundred pounds have been received by the total stakes adding machine and eighty-four pounds have been received by the odds adding machine, the pointer 100 will be at zero.

A slipping clutch 102 on the shaft 99 allows the pointer 100 to be turned to zero after zeroising the adding machine at the end of each race.

The odds switch OS carrying the pointer 118 and flange 124 (having two pins which pass through holes in the driving flange 123 pinned to the shaft 114) is normally held by spring 119 so that the two pins engage in dog 115 attached to gear 120.

Gears 116 engage the wiper rotor gears 117 so that when the knob OS is pulled outwards and rotated, it turns shaft 114 and rotates the five sets of wipers in the five banks. A check magnet may be provided to engage flange 124 so that OS cannot be pulled out unless the non-runner keys are thrown first.

When the dog 115 is engaged by the two pins the gear 120 meshing with worm 122 may be rotated by shaft 121 which is under control of a differential drive biased by two slipping clutches to rotate in clockwise or counterclockwise direction when released by escapements on relays DM or SM which lie under DM. The cam C turns half of a revolution when DM or SM operate either clockwise or counterclockwise according to which relay operates, and as soon as C commences to rotate, contacts c1 close and operate H5 relay which is released as soon as C has made its half revolution and comes to rest.

These movements raise or lower the odds by moving wipers OS1 to OS36 on to a different set of contacts for each change and the changes are initiated when the switch 125 carrying levels IS1 to IS4 has rotated to earth a wire marked by the deficit check switch DC or the surplus check switch SC.

The wipers IS1 to IS4 are insulated from but allowed to float on shaft 99, and contacts *md* to *ms* are so arranged that *ms* marks a contact only when the shaft 99 is turning to surplus and *md* makes a contact only when it is turning to deficit.

An additional switch deficit release DR is provided and provision is made so that having dropped to a specified deficiency the competitor may be prevented from accepting any more bets until the deficiency has been reduced to an amount specified by the switch DR.

Operation of the automatic change of odds is as follows:

Assume that the controls DC, DR or SC, Figs. 4 and 10 and 11, are set as shown, when the pointer 100 moves to deficit, that is counterclockwise from zero and reaches 20, contacts *md* are closed and wiper IS1 has marked the wire marked by switch DC, Fig. 4. Relay DS4 (Fig. 4) operates and locks over contacts *ds*3, and operates HL3. Contacts *ds*1 (Fig. 4) close in preparation to operate DM but DM must wait until close sales relay CSX4 (Fig. 2) has restored and re-made *cs*2 (Fig. 3). Contacts *ds*2 (Fig. 4) open and take the earth off the close sales relay CSX4, Fig. 2, and unless a bet is being sent CSX4 restores. If a bet is being sent, CSX4 will remain held over its second winding until the bet is clear. When CSX4 restores, contacts *cs*1 (Fig. 3) take the earth off the odds leads 5 and the indicator relay BK4 (Fig. 3), so that all S1 relays (Fig. 1) held on that competitor restore and release their odds selector, and the indicators go to blank. Contacts *cs*2 close and DM operates, which releases shaft 121 and cam C to turn (see also Figs. 9 and 10), when the wipers OS1 to OS36 are turned to the next lower odds. Whilst cam C is turning, H5 operates and rings the bell at *b* at *h*1 ensures keeping the earth off the odds leads and blank relay at *h*2, and releases DS4 at *h*3 so that CSX4 may open sales on another competitor or competitors. When cam C has completed its half turn and broken contacts *c*1, relay H5 remains held over contacts *hl*1 and *h*6 until stakes being registered on other competitors have reduced the deficit to £5 as indicated by switch DR which shorts out the resistance DRR, Fig. 4, and relay HL4 restores and releases H5 so that bets may be accepted again.

When relay HL4 is operated the deficit signal lamp DL glows.

If on the other hand the pointer 100 moves to surplus, as the surplus check switch is set at 50, relay SS4 (Fig. 4) will pick up an earth from contacts $ms$ (Fig. 5), wipers IS3 and switch SC (Fig. 4) when the pointer reaches 50 and SS4 will operate. Close sales relay CSX4 (Fig. 2) will restore by breaking $ss2$ (Fig. 4) but HL4 will not operate. Relay SM will operate and C will rotate in the opposite direction to raise the odds values, H5 operating as soon as cam C closes contacts C1.

Sales will be opened again as soon as C has completed its half turn. Whilst H6 is operated with HL4 normal, lamp SL will glow.

The automatic control may be rendered ineffective by throwing keys SSK to DSK, which prevent relays SS4 an DS4 operating (Fig. 4).

To prevent bets from being taken on high or low or both values on any competitor, keys RKH or RKL or both must be thrown and then close sales key thrown and restored to release the relays NRH3 and NRL3 (Fig. 4) or both. When these relays are restored, a bet being sent is diverted at contacts $nrl2$ or $nrh2$, Fig. 4, to operate the cancel relay CL1, Fig. 3, which through contacts $cl1$ and $mx3$, Fig. 1, energises relay RN3, Fig. 1, and operates the solenoid S in the ticket machine sending the bet.

To guard the operation of the pulse magnets LP2 in each odds adding machine, Fig. 5, contacts $lp1$ and $lp2$ are provided. Contacts $lp1$ are wired in series from earth through all odds adding machines to relay PC1, Fig. 3, so that PC1 will not operate until all magnets LP2 have operated. Contacts $lp2$ close to earth on one side and the other side is commoned through all odds adding machines, so that any magnet LP2 operating will operate relay PH1 (Fig. 3), and PH1 will remain operated until all LP2 magnets have restored. If PC1 and PH1 do not operate and restore together, contacts $pc1$ or $nh1$ will make a through circuit to relay PG1 which will operate and hold up further betting. In practice contacts LP, Fig. 3, will be increased in number so that not more than two LP2 magnets are operated from one pair of contacts.

Where the ticket issuing machines are situated at any great distance from the adding machine, the odds control wires 5 may be reduced to say five in number and the twenty-five positions be marked on a rotary switch for a coin operated ticket issuing machine for instance, by using coding relays, Fig. 12.

Wipers OS37 to OS41 (Fig. 12) replace OS20 in the odds adding machine, Figs. 4 and 5.

The switch CS is the competitor switch, which may be rotated by a telephone dial or like means, and this pre-sets the competitor type wheel CT and operates a competitor selecting relay CI5 for instance when competitor one is selected; this associates the coding relays A1, B2, C4, D6, E$^1$6 and E$^2$6 with the odds lines O1 which are marked in different combinations to cause the odds finder switch OF1 to respond to the same position as the odds switch in the odds adding machine OS37 to OS41.

To demonstrate this control it will be seen that with the wipers OS37 to OS41 in the vertical position shown no wipers are marked, all coding relays are normal, and an earth is passed via contacts $a1$, $b1$, $c1$, $d1$ and $e'1$ to OF1 which operates relay S3 when wipers OF1 are vertical and stops the driving magnet OFDM1 at contacts S1. When wipers OS37 to OS41 have moved to the next position, an earth will be applied to E$^1$6 and E$^2$6 relays and the earth will be passed via $a1$, $b1$, $c1$, $d'$ with $e'1$ changed over to mark the second position to which OF1 will respond. It must be noted that for convenience wipers OS37 to OS41 are rotating clockwise and OF1 rotate counterclockwise. Similarly, if the odds switch on the adding machine OS37 to OS41 has been turned to the twenty-fourth position relays A1, C4, D6, E$^1$6 and E$^2$6 would be marked and would operate so that the earth would pass via contacts $a1$, $b2$, $c3$, $d6$, and $e^26$ with $e^26$ down and would mark the twenty-fourth contact on OF1.

The odds finder switch presets the odds type wheel OT and an indicator OI, visible to the bettor. Whilst the odds switch is turning, relay S8 is normal and this closes the coin slot by operating the coin lock magnet CL at contact S2. If a coin has been inserted and the odds change whilst the machine is waiting for the bet to be collected, S8 will restore and operate a rejection magnet at contact S3 so that the coin held in the coin retainer CR will be returned to the bettor. When the bet is accepted the release relay operates another magnet at $r1$ and the coin drops into the coin box.

As another means of presetting the odds type from a five line control, accumulated movements through differential gears are used as shown in Figs. 13 and 14. Arms on the differential spiders are retained by pawls on the relay armatures so that when each relay operates the arm rotates until it is checked against a stop bar, actuated by a coiled spring 150. Arm 151 rests on the pawl 152 and when released turns 180° until it bears on stop bar 153. Arm 154 rests under pawl 155 and when this is released it rotates in the opposite direction 90° until it engages stop bar 156. Arm 157 rests on pawl 158, and stirrup 159 on the same spider as 157 allows this spider to turn 45° in the same direction as arm 151. Arm 160 rests under pawl 161 and stirrup 162 allows this spider to turn 22½° in the same direction as 154. Arm 163 rests on pawl 164 and stirrup 165 allows this spider to turn 11¼° in the same direction as 151 and 157.

Thus, by releasing these magnets in different combinations 32 type positions may be obtained.

Rack 166 engages gear 167 which turns with the type wheel 168 and this moves in as the type wheel is set up and will restore the type wheel until all the arms rest on or under their pawls, by being drawn back after each printing operation, if preferred during the issue of a ticket.

Fig. 15 shows a method of checking the operation of relays V/1, W/1, X/1, Y/1 and Z/1 shown in Fig. 13. Five additional levels are added to the odds switch on the odds adding machine OS42 to OS51 and so wired that at each position at which OS42 puts out an earth to the ticket machines, OS43 will put out an earth to the differential relay DA/1, so that when a machine operates to send a bet, contacts $c't1$ close and if OS42 has put an earth on the line V/1 will operate and close contacts V1, and a relay closes contacts C'$a1$ in the odds adding machine providing an earth to de-magnetise DA/1 so that it will restore.

The same condition is applied to each of the five differential relays, and unless they are all normal the release circuit to the release relay R in the ticket issuing machine will be broken over contacts $da1$, $db1$, $dc1$, $dd1$, or $de1$ and the machine will not release.

Referring again to the ticket issuing machine, Fig. 8, the solenoid S when operating withdraws the plunger 31 which engages the T-shaped lever 24 and withdraws plunger 15 when a bet is cancelled.

To permit a test ticket to be obtained without affecting the ticket counters, link 26 operates the crank 27 so that the plate 28 carrying pins 29 cannot be engaged by the operating plate 30 which rotates with the printing shaft 31' actuated by the printing handle PH except when the plunger 15 has been released and locked the dial 1 when it has been rotated to select and print a competitor's number.

When the plate 30 engages pin 29, cam 32 is rotated which operates roller 33, arm 34 and this actuates arm 35 at the other side of the machine, see Fig. 7, to which is attached striker 36 to engage lever 37 of counter 39 for a low value bet, or lever 38 of counter 40, when the stake control lever 4ª has moved the type 16 by link 17 and pin 41 has operated the selector 42 for a high value bet.

The gear 21 of the odds selector rotates the odds type wheel 43, and the gear 44 of the competitor selector 1 rotates the competitor type wheel 45.

I claim:

1. A totalisator installation including a ticket printing and issuing machine operable to effect the printing and issuing of tickets each bearing the identification of the competitor, the selected stake value and the pay-off value of the ticket, the ticket printing and issuing machine including printing wheels for printing the identification of the competitor, the selected stake value and the pay-off value respectively, said installation including an odds adding machine for each competitor for registering the pay-off value of tickets issued on said competitor, a total stakes adding machine for registering the total of the stake values of tickets issued on all competitors, control means individual to each competitor and operatively associated with and responsive to the operation of the respective odds adding machine and operatively associated with and responsive to the operation of the total adding machine, means responsive to the operation of the control means for setting up a value corresponding to the odds, means responsive to the operation of the control means for setting up a value corresponding to the pay-off value, means responsive to the means for setting up the pay-off value for controlling the operation of the pay-off value printing wheel, means in the ticket issuing machine for actuating the pay-off value and stake value printing wheels, and means responsive to the operation of the ticket printing and issuing machine for actuating the total stakes adding machine for registering the stake value of each ticket thereon and for operating the odds adding machine of the competitor identified on said ticket for registering thereon the pay-off value of said ticket.

2. A totalisator installation as claimed in claim 1, in which said control means comprises a differential balancing unit, the opposite sides of which are actuated respectively by the respective odds adding machine operatively associated therewith and by the total stakes adding machine.

3. A totalisator installation as claimed in claim 2, in which means is provided for adjusting the actuation of the differential balancing unit to a predetermined extent by said adding machines to provide for a cash percentage for overhead.

4. A totalisator installation as claimed in claim 1, in which said control means comprises a differential balancing unit, the opposite sides of which are actuated respectively by the respective odds adding machine operatively associated therewith and by the total adding machine, and means for indicating any difference in the total values registered on said odds adding machine and the total adding machine.

5. A totalisator installation as claimed in claim 1, in which each odds adding machine includes a plurality of electromagnets representing separate amounts of increasing value, escapement wheels having various numbers of teeth upon which said electromagnets operate, and differential gears carried on shafts interconnecting said escapement wheels.

6. A totalisator installation as claimed in claim 1, in which each odds adding machine includes a plurality of electromagnets representing separate amounts of increasing value, a multiple switch for each odds adding machine, said switch being wired for the supply of current to selected groups of said plurality of electromagnets, and means for actuating said switch to different positions for connecting up different selected groups of electromagnets, whereby the pay off value for tickets to be issued on the respective competitor represented by said odds adding machine may be registered thereon at various odds and for various stake values.

7. A totalisator installation as claimed in claim 1, including means for stopping the operation of the ticket printing and issuing machine with respect to the issue of a ticket on a particular competitor, such means being responsive to the operation of the means for setting up a pay-off value corresponding to the odds, when said value exceeds the value registered on the total stakes adding machine.

8. A totalisator installation as claimed in claim 1, including means for stopping the operation of the ticket printing and issuing machine with respect to the issue of a ticket on a particular competitor, such means being responsive to the operation of the means for setting up a pay-off value corresponding to the odds, when said value exceeds the value registered on the total stakes adding machine, and means for preventing operation of said stopping means when the ticket printing and issuing machine is in the process of issuing a ticket.

9. A totalisator installation as claimed in claim 1, in which the means for setting up a pay-off value corresponding to the odds includes means for automatically reducing the odds when the value registered on the respective odds adding machine exceeds the value registered on the total stakes adding machine by a preselected amount.

10. A totalisator installation as claimed in claim 1, including means for stopping the operation of the ticket printing and issuing machine with respect to the issue of a ticket on a particular competitor, such means being responsive to the operation of the means for setting up a pay-off value corresponding to the odds, when said value exceeds the value registered on the total stakes adding machine, and means for automatically releasing said ticket printing and issuing machine with respect to the acceptance of bets on said competitor when the difference between the values registered on the respective odds adding machine and the total stakes adding machine has been reduced to a preselected amount.

11. A totalisator installation as claimed in claim 1, in which the means for setting up a pay-off value corresponding to the odds includes means for automatically raising the odds when the value registered on the respective odds adding machine is less than the value registered on the total stakes adding machine by a preselected amount.

12. A totalisator installation as claimed in claim 1, in which each odds adding machine includes a plurality of electromagnets representing separate amounts of increasing value, means for energizing selected groups of the electromagnets in each machine in response to actuation of the ticket printing and issuing machine, and means for stopping the operation of the ticket printing and issuing machine in response to the failure of any of said electromagnets to operate.

13. A totalisator installation as claimed in claim 1, in which each odds adding machine includes a plurality of electromagnets representing separate amounts of increasing value, means for energizing selected groups of the electromagnets in each machine in response to actuation of the ticket printing and issuing machine, means for stopping the operation of the ticket printing and issuing machine in response to the failure of any of said electromagnets to operate, each electromagnet including contacts for effecting its energization, and additional contacts for each of said electromagnets wired to the ticket printing and issuing machine for stopping operation of the ticket printing and issuing machine in response to the failure of any magnet to be restored to its initial position after actuation.

14. A totalisator installation as claimed in claim 1, including a plurality of ticket printing and issuing machines electrically connected into the odds adding machines, each odds adding machine including a plurality of electromagnets representing separate amounts of increasing value, control means for energizing selected groups of magnets in each odds adding machine, and circuit means for transmitting the pay-off value registered by any one of the ticket issuing machines for any competitor to the others of the ticket issuing machines.

15. A totalisator installation as claimed in claim 1 including a plurality of ticket issuing and printing machines, and means for simultaneously registering bets on different competitors on their respective odds adding machines and on the total adding machine.

16. A totalisator installation as claimed in claim 1, including a selector switch bank operatively associated with each control means for controlling the operation of the respective odds adding machine associated with said control means, and a plurality of coding relays operatively associated with a selector switch bank and operable in combinations for controlling the registration of pay-off values on the odds adding machine.

17. A totalisator installation as claimed in claim 1, in which the control means includes a differential gear, means for driving one side of the differential gear in one direction by the movements of the respective odds adding machine, and means for driving the other side of the differential gear in the opposite direction by the movements of the total stakes adding machine.

JOHN HANDLEY.

REFERENCES CITED

The following references are of record in the file of this patent:

UNITED STATES PATENTS

| Number | Name | Date |
|---|---|---|
| 1,591,995 | Pass | July 13, 1926 |
| 1,963,907 | Julius et al. | June 19, 1934 |
| 2,167,513 | Johnston | July 25, 1939 |
| 2,479,681 | Handley | Aug. 23, 1949 |

FOREIGN PATENTS

| Number | Country | Date |
|---|---|---|
| 312,970 | Great Britain | June 4, 1929 |
| 332,189 | Great Britain | July 15, 1930 |
| 434,273 | Great Britain | Aug. 26, 1935 |
| 507,069 | Great Britain | June 8, 1939 |
| 563,514 | Great Britain | Aug. 17, 1944 |